Jan. 10, 1928. Re. 16,848

E. E. BERRY

SUCTION ROLL FOR PAPER MAKING MACHINES

Original Filed Dec. 15, 1923 4 Sheets-Sheet 1

Inventor:
Earl Elwin Berry.
By: Charles Fels
Attys.

Jan. 10, 1928. Re. 16,848

E. E. BERRY

SUCTION ROLL FOR PAPER MAKING MACHINES

Original Filed Dec. 15, 1923 4 Sheets-Sheet 2

Inventor:
Earl Elwin Berry.
by: Charles W. Helm
Attys

Jan. 10, 1928.
Re. 16,848
E. E. BERRY
SUCTION ROLL FOR PAPER MAKING MACHINES
Original Filed Dec. 15, 1923 4 Sheets-Sheet 3
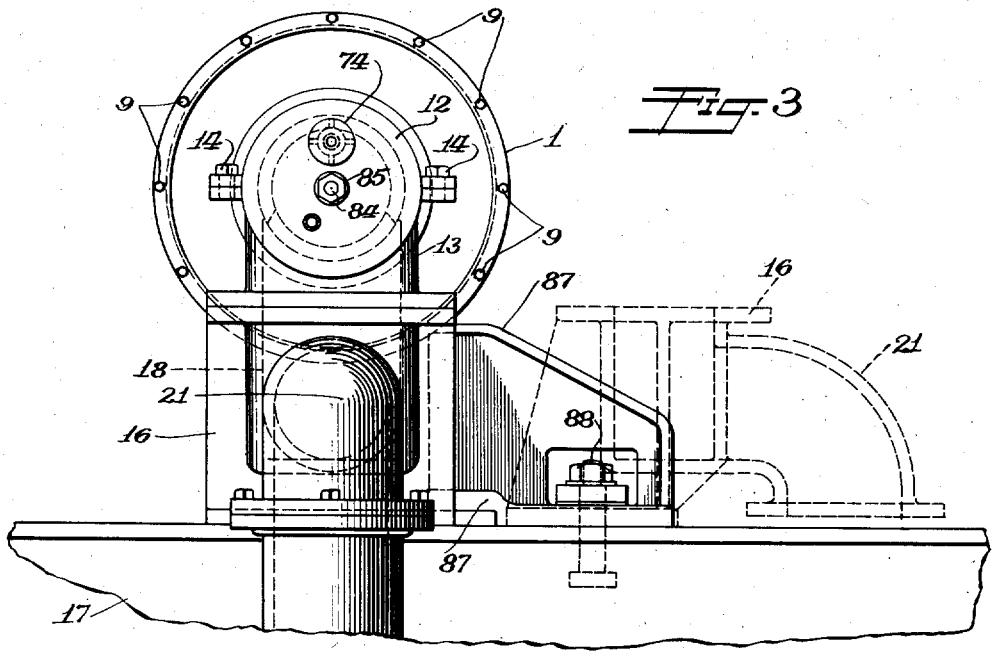
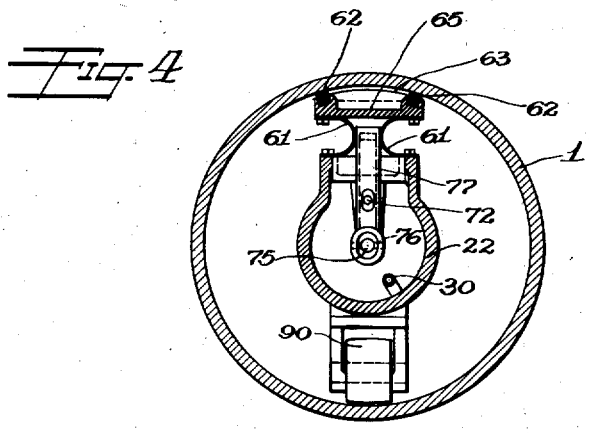
Inventor:
Earl Elwin Berry
By: Charles W. Hill
Atty.

Jan. 10, 1928. Re. 16,848

E. E. BERRY

SUCTION ROLL FOR PAPER MAKING MACHINES

Original Filed Dec. 15, 1923 4 Sheets-Sheet 4

Inventor:
Earl Elwin Berry.
by: Charles Hill
Atty.

Reissued Jan. 10, 1928. Re. 16,848

UNITED STATES PATENT OFFICE.

EARL E. BERRY, OF BELOIT, WISCONSIN, ASSIGNOR TO BELOIT IRON WORKS, OF BELOIT, WISCONSIN, A CORPORATION OF WISCONSIN.

SUCTION ROLL FOR PAPER-MAKING MACHINES.

Original No. 1,602,875, dated October 12, 1926, Serial No. 680,825, filed December 15, 1923. Application for reissue filed November 14, 1927. Serial No. 233,288.

My invention relates to suction rolls for paper making machines.

One of the objects of the invention is to provide a simple, practical and advantageous construction of suction roll and suction compartment or chamber therefor.

Another object of the invention is to simplify the construction of the roll and the suction chamber and the cooperating and associated parts and mechanisms.

Another object of the invention is to avoid the use of driving gears and secure direct driving of the roll as in the case of ordinary plain rolls in paper machines.

Another object of the invention is to provide new and improved mechanism for cooperating with the suction roll and the suction chamber therein and permitting and adapted for the direct drive of the suction roll.

Another object of the invention is to provide simple and practical mechanism for permitting the withdrawal or removal of the suction chamber from within the suction roll, and also for permitting the removal of a wire from the roll and replacement of another one thereon.

In the accompanying drawings Figure 1 is a longitudinal section of an end portion of a suction roll and suction chamber embodying my present invention.

Figure 3 is a view of the end of the device shown in Figure 1.

Figures 4, 5 and 6 are cross sections taken on lines IV—IV, V—V and VI—VI, respectively, in Figure 2.

Figure 1:
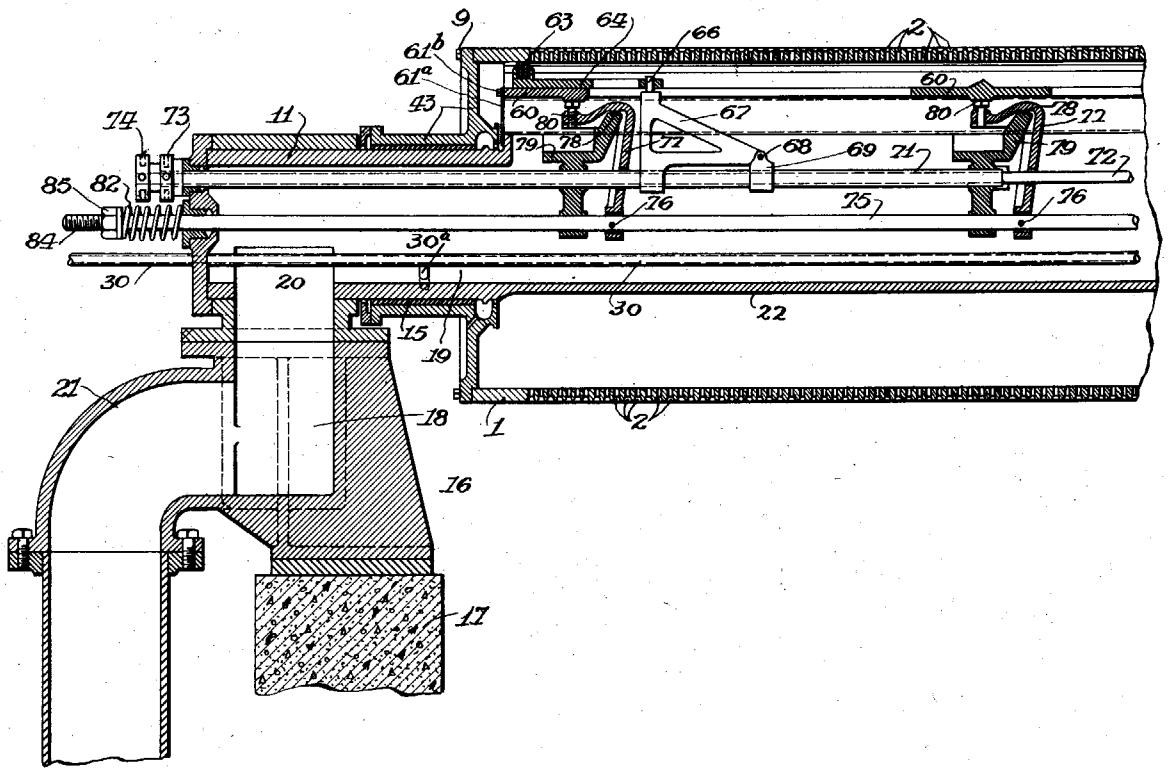

Referring to the drawings, I show a suction roll embodying a cylindrical portion 1 which is provided with apertures 2—2. This cylindric member is mounted to rotate and to such end is provided at one end with a head 3 having a cylindric or journal portion 4, and at the other end with another head 5 having a cylindric bearing or journal portion 6 which is preferably provided with a tapering extension 7 terminating in a reduced cylindric portion 8. The heads 3 and 5 are preferably secured detachably to the cylindric member 1, the head 3 by bolts 9 and the head 5 by bolts 10, so that these heads may if desired, be removed as will be referred to later.

The cylindric roll thus formed is preferably mounted upon a member which forms both a rigid and stationary axis and also a suction member for use within the roll. This member comprises a cylindric portion 11 fitting within the cylindric end 4 of the head 3, said member 11 being confined within and supported by a bearing conveniently consisting of an upper member 12 and a lower member 13, which are held together by bolts 14—14, which latter may be so tightened as to clamp the members 12 and 13 together and thereby hold the cylindric member 11 firmly in a stationary condition. A collar or sleeve 15 of suitable bearing metal is preferably interposed between the cylindric portion 4 and the member 11 to permit rotation and takeup wear.

The bearing 12, 13 is conveniently mounted on a pedestal 16 which in turn is mounted on a foundation or floor 17. The pedestal 16 has a chamber 18, the upper end of which communicates with the interior 19 of the cylindric portion 11 through an opening 20 in the member 11, and said chamber 18 also communicates with a suction pipe 21 whereby a condition of suction or reduced air pressure may be provided in the interior of member 11.

The member 11 is preferably the end portion of a suction chamber 22 which extends lengthwise through the suction roll and whose other end is provided with a cylindric portion 23 which forms the bearing for the rotary roll end 6, a sleeve 24 of suitable bearing metal being preferably interposed between trunnion 23 and bearing 6. Thus the suction roll contains and revolves about the suction compartment or chamber 22 whose ends form fixed shaft sections or trunnions for the cylindric ends or bearings of the suction roll.

Figure 2:
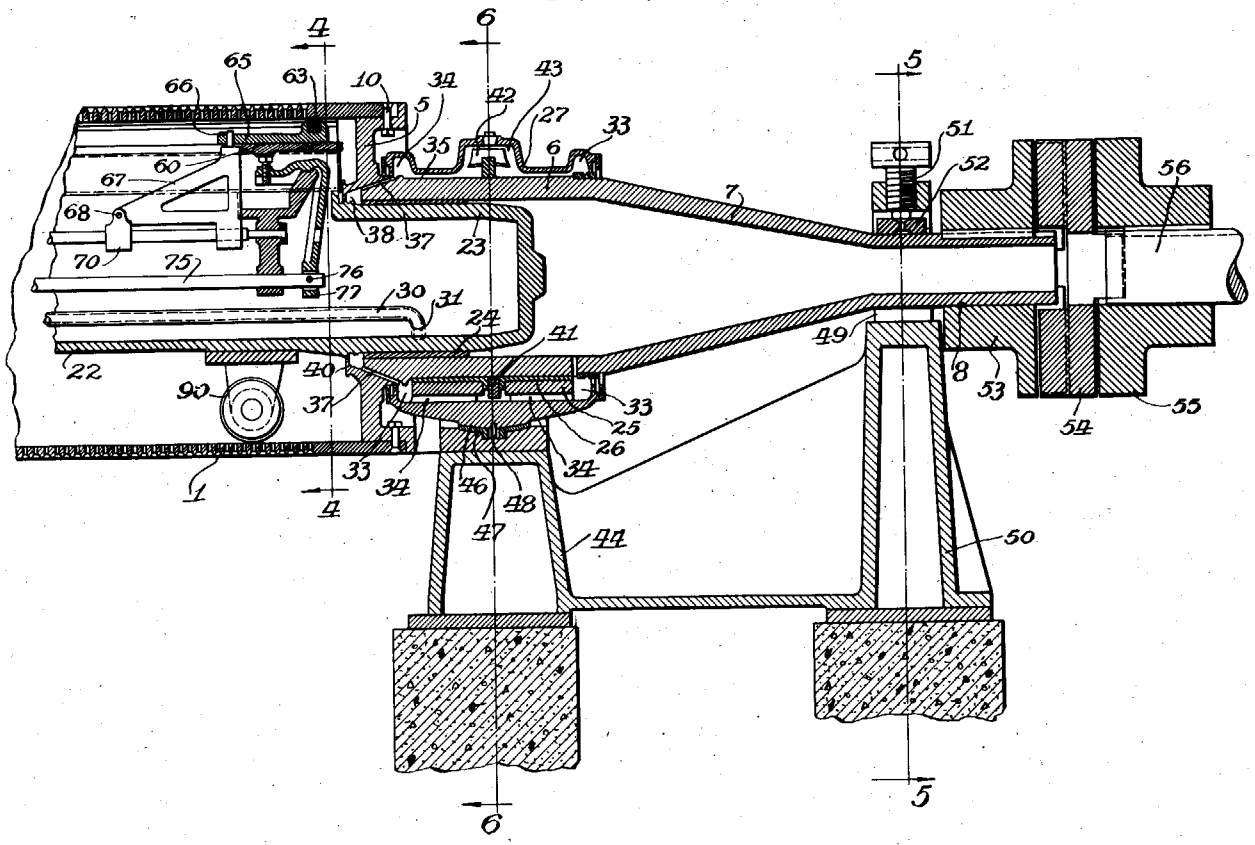
Figure 2 is a similar longitudinal section of the opposite end of the roll and chamber.
Figure 5:
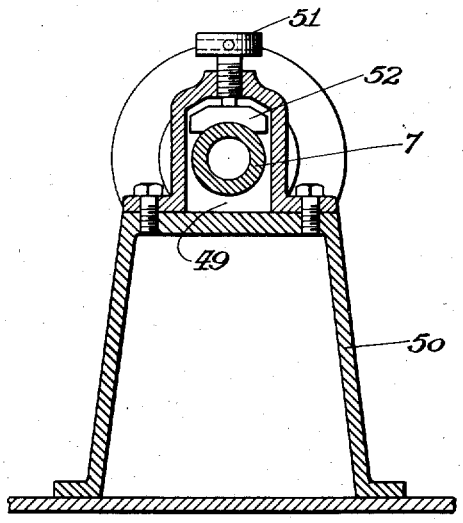
Figure 6:
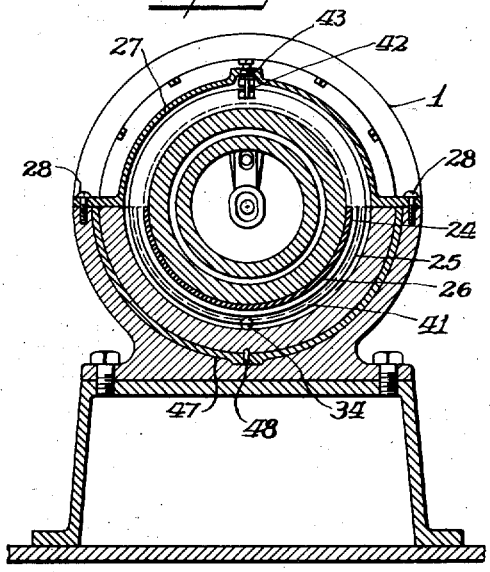
Figure 7:
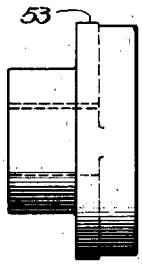
Figures 7, 8, 9 and 10 are views of a coupling for connection with the suction roll for driving the same.
Figure 8:
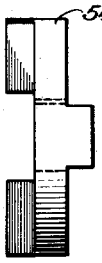
Figure 9:
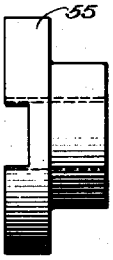
Figure 10:
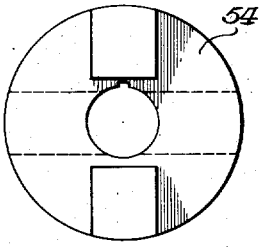

The rotary end 6 of the suction roll is mounted in a bearing conveniently comprising a bearing member 25 containing a sleeve 26 of suitable bearing material, in which the member 23 rests and rotates (Figs. 2 and 6). A cap 27 is fitted upon the bearing member 25, being preferably secured thereto by screws 28. This bearing is oiled, preferably by means of an oil pipe 30, which extends from some source of oil supply into and along the interior of the suction chamber and has its end 31 connected to the member 23 and in communication with an opening therein leading to the bearing metal sleeve 24, said oil pipe 30 having a branch pipe 30[a] for oiling the member 11 in bearing sleeve 15. Oil chambers 33—33 and oil ducts 34 and 35 are provided for oiling the outside of the rotary end 6 and oil ducts 37—37 with an oil chamber 38 are provided for conveying oil to this bearing, an annular oil partition 40 being provided to prevent the escape of oil into the interior of the suction roll. A ring 41 is mounted on the cylindric member 6 and provided with a wiper 42 in position in a recess 43 in the cap 27.

The bearing member 25 is mounted on a pedestal 44 and a rocking bearing is preferably provided, as by making the lower surface 46 of said bearing 25 of circular form and providing a correspondingly curved seat 47 so as to permit a moderate amount of swinging or tilting motion on the part of the member 6, and therefore on the part of the suction roll, such motion being limited by a pin 48.

The reduced end 8 of the member 6 is extended through an aperture 49 in another pedestal 50 and this end 8 is subject to the action of an adjusting screw 51 carrying an end nut 52 bearing on the end 8 so that by screwing the screw 51 down pressure will be exerted on portion 8 and thereby cause said portion 8 to be depressed and consequently elevating the opposite end 11 of the suction roll about the curved bearing seat 46, the purpose of which will be described later on.

The end 8 is also preferably provided with a coupling by which it may be driven from a suitable source of power, and this coupling is preferably of such nature as to take up the adjustment of the member 8 above referred to. This coupling is shown in Figure 2 and also in Figures 7 to 10 inclusive, and may consist of separate members 53, 54 and 55, whereof member 53 is splined or otherwise secured to member 8, and member 54 has a sliding connection with member 53, and member 55 a crosswise sliding connection with 53, and member 55 has a sliding crosswise connection with member 54. Member 55 is understood to be splined or otherwise secured to a rotary shaft 56 extending to a suitable source of power.

The suction chamber 22 is arranged so that its upper portion may be adjusted relatively to the inside of the suction roll cylinder 1 so as to secure a tight contact therewith, and provision is made for varying this adjustment in accordance with circumstances and various requirements, and also a deckel arrangement is preferably provided for accommodating different widths of paper.

As a preferred arrangement the suction chamber 22 is provided with an upper member 60 mounted on springlike members 61—61, so that said member 60 may have a vertical adjustment relative to the cylindric member 1. Small plates 61[a] are arranged at the ends of the suction chamber to keep it air tight. These plates preferably of flexible material are secured to member 60 by screws 61[b], and will be sucked against ends of shoulder 22 and of members 61—61, so as to make air tight joints at the ends of suction chamber. The member 60 carries longitudinally extending laminated brushes 62 and transversely extending laminated brushes 63 connecting the brushes 62 at their ends, and the brushes 63 are mounted on slides 64 and 65 adapted to slide longitudinally of the suction roll and so move the brushes 63 to cover more or less of the roll apertures 2—2, and so accommodate the roll for different widths of paper.

The slides 64 and 65 are connected by pins 66 with the brackets 67 in turn pivoted at 68 to collars 69 and 70, whereof the collar 69 is mounted on a tubular rod 71 and the collar 70 on a rod 72 contained within and arranged to slide relatively to the rod 71. These rods 71 and 72 extend out through the left hand end of the suction chamber and are provided the rod 71 with a rotary adjusting wheel 73, and the rod 72 with an adjusting wheel 74, whereby either one or both of these wheels 73 and 74 may be turned so as to adjust the brushes 63—63 in the manner and for the purpose above set forth.

In order to adjust the upper portion of the suction chamber vertically to secure and maintain an air tight connection with the suction roll, a rod 75 is extended longitudinally within the suction chamber and connected by pins 76 with swinging levers 77 which are pivoted at 78 on fixed brackets 79, the upper ends of said levers 77 being in engagement with the upper suction roll member 60 preferably through the medium of adjusting screws 80 which permit adjustment so that all of said levers may be similarly arranged for movement of the upper portion or part of the suction roll. The rod 75 extends preferably through the left hand end of the suction chamber and is provided with a spring 82 subjecting it to pressure tending to move it to the left, referring to Figure 1, and thereby cause the levers 77 to exert an upward pressure on the upper portion of the suction chamber, to cause a tight joint between the same and the interior surface of the suction roll. Rod 75 is provided with a threaded end 84 on which is mounted a nut 85 to permit adjustment of tension of spring 82 and thereby cause desired variations in the pressure of the suction chamber upon the suction roll. It will be seen that this adjustment of the suction chamber may be made as desired by the mechanical means provided and may be independent of the suction pressure within the suction chamber.

As a matter of further improvement in the mounting of the roll, the bearing block 13 is mounted on the pedestal 16 in such manner that said block 13 may be lifted slightly above the pedestal 16 and the latter is provided with a side extension 87 (Figure 3), which is pivoted by bolt 88 to the foundation member 17 so that said member 16 may be swung out from under the member 13. This is done in order to permit changing of a wire, the member 16 being moved out from under member 13 to permit the wire to be slid over and around the suction roll. The lifting of the member 13 to permit member 16 to be swung out into sidewise position, as indicated in dotted lines in Figure 3, may be accomplished by actuating screw 51 so as to depress the contracted roll end 8, the depressing of this end tilting the other end of the roll upward, and thereby lifting the member 13 slightly.

As a matter of still further improvement the suction chamber is preferably provided with wheels or rollers 90 (Figure 2) conveniently secured to the under side of said chamber and adapted to roll on the under portion of the cylindric member 1, whereby the suction chamber may be removed from the suction roll for purposes of repair or replacement, when this takes place the axle or trunnion end 23 simply being withdrawn from within the roll end 6, and when the suction chamber is replaced the tapering end of the member 23 permits the proper fitting together of the parts. The roll or wheel 90 is preferably mounted so that it will normally be slightly above the roll surface, thereby permitting rotation of the latter without any interference by said wheel 90.

It will be seen that the construction permits a direct drive of the suction roll through the medium of the drive connection 53, 54 and 55, or through the medium of other connections or couplings as it may be desired to use. This dispenses with intermediate gears and simplifies and cheapens construction, as well as yielding the well known advantages of direct drive.

Reference is made to my copending application Serial No. 636,863, filed May 5, 1923, showing and claiming some of the features of the invention herein set forth.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with the rotary perforated shell or casing and a suction box therein, of bearings on the suction box for supporting the rotary shell or casing for rotation, the ends of the suction box having projections one of which is extended through the end of the rotary shell or casing and provided with means for engaging and holding it against rotation, and the projection at the other end being enclosed within the corresponding end on the rotary shell or casing.

2. The combination with a rotary shell or casing having its ends provided with tubular members and a suction box arranged within the shell or casing and having its ends provided with projections serving as supporting journals for the rotation of the shell or casing relatively to the suction box, the projection at one end of the suction box extending through the corresponding tubular end of the rotary shell or casing, and the projection at the other end being enclosed within the corresponding tubular end member of the rotary shell or casing, and means for engaging the projection on the suction box which extends through the corresponding end of the tubular member and holding the same against rotation.

3. The combination with a rotary shell or casing having its ends provided with tubular members and a suction box arranged within the shell or casing and having its ends provided with projections serving as supporting journals for the rotation of the shell or casing relatively to the suction box, the projection at one end of the suction box extending through the corresponding tubular end of the rotary shell or casing, and the projection at the other end being enclosed within the corresponding tubular end member of the rotary shell or casing, and means for engaging the projection on the suction box which extends through the corresponding end of the tubular member and holding the same against rotation, said engaging and holding device being mounted on a pedestal which serves also to support the adjacent projecting end of the suction box.

4. The combination with a suction roll, of a suction chamber therein, one end of the suction chamber projecting through and beyond the corresponding end of the suction roll and forming an axle or trunnion for said end of the roll, and being mounted and held against rotation, and the other end of the suction chamber being fitted within the other end of the suction roll, which roll end is extended beyond the suction chamber and arranged to rotate about said suction chamber end and being also provided with means for mounting it for rotation.

5. The combination with a suction roll, of a suction chamber therein, one end of the suction chamber projecting through and beyond the corresponding end of the suction roll and forming an axle or trunnion for said end of the roll, and being mounted and held against rotation, and the other end of the suction chamber being fitted within the other end of the suction roll, which roll end is extended beyond the suction chamber and arranged to rotate about said suction chamber end and is provided with means for mounting it for rotation, said last mentioned suction roll end being extended beyond the suction chamber end and being provided with direct driving means.

6. The combination with a suction roll, of a suction chamber therein, one end of the suction chamber projecting through and beyond the corresponding end of the suction roll and forming an axle or trunnion for said end of the roll, and being mounted and held against rotation, and the other end of the suction chamber being fitted within the other end of the suction roll, which roll end is extended beyond the suction chamber and arranged to rotate about said suction chamber end and is provided with means for mounting it for rotation, said last mentioned end of the suction roll being extended beyond the suction chamber and being reduced in size and having a contracted end provided with direct driving means.

7. The combination with a suction roll, of a suction chamber therein, one end of the suction chamber projecting through and beyond the corresponding end of the suction roll and forming an axle or trunnion for said end of the roll, and being mounted and held against rotation, and the other end of the suction chamber being fitted within the other end of the suction roll, which roll end is extended beyond the suction chamber and arranged to rotate about said suction chamber end and is provided with means for mounting it for rotation, said last mentioned suction roll end being extended beyond the suction chamber end and being provided with direct driving means, and means for depressing said extended end of the suction roll, said bearing means therefor being adapted to permit a tilting motion and the mounting means for the other end of the suction roll being arranged for temporary removal.

8. The combination with a suction roll, of a suction chamber therein, one end of the suction chamber projecting through and beyond the corresponding end of the suction roll and forming an axle or trunnion for said end of the roll, and being mounted and held against rotation, and the other end of the suction chamber being fitted within the other end of the suction roll, which roll end is extended beyond the suction chamber and arranged to rotate about said suction chamber end and is provided with means for mounting it for rotation, said last mentioned suction roll end being extended beyond the suction chamber end and being provided with direct driving means, and means for depressing said extended end of the suction roll, said bearing means therefor being adapted to permit a tilting motion and the mounting means for the other end of the suction roll being arranged for temporary removal, said last mentioned means comprising a pedestal having an adjusting screw adapted to act upon the upper surface of the extended roll portion and thereby depress the same.

9. The combination with a suction roll of a suction chamber therein, one end of said suction chamber extended through and beyond the end of the suction roll and forming an axis on which said end of the roll may rotate, and the other end of the suction chamber being fitted within the other end of the roll, supporting means for the first mentioned end of the suction chamber, said supporting means comprising bearing blocks adapted to be clamped firmly together to hold said suction chamber against rotation, the second mentioned end of the suction roll being provided with an end which encloses and rotates about the second mentioned end of the suction chamber, said end being extended beyond the end of the suction chamber and arranged for direct driving means, a bearing supporting said second mentioned end of the suction roll, said bearing being adapted to permit the rotation of said roll containing the second mentioned suction roll end.

10. The combination with a suction roll of a suction chamber therein, one end of said suction chamber extended through and beyond the end of the suction roll and forming an axis on which said end of the roll may rotate, and the other end of the suction roll being fitted within the other end of the roll, supporting means for the first mentioned end of the suction chamber, said supporting means comprising bearing blocks adapted to be clamped firmly together to hold said suction chamber against rotation, the second mentioned end of the suction roll being provided with an end which encloses and rotates about the second mentioned end of the suction chamber, said end being extended beyond the end of the suction chamber and arranged for direct driving means, a bearing supporting said second mentioned end of the suction roll, said bearing being adapted to permit the rotation of said roll containing the second mentioned suction roll trunnion or axle, means for supporting said bearing so as to permit a vertical tilting motion thereof, and means for engaging the extended end of the roll and acting upon the same to cause a tilting motion of the roll.

11. The combination with a suction roll of a suction chamber therein, one end of said suction chamber extended through and beyond the end of the suction roll and forming an axle on which said end of the roll may rotate, and the other end of the suction roll being fitted within the other end of the roll, supporting means for the first mentioned end of the suction chamber, said supporting means comprising bearing blocks adapted to be clamped firmly together to hold said suction chamber against rotation, the second mentioned end of the suction roll being provided with an end which encloses and rotates about the second mentioned end of the suction chamber, said end being extended beyond the end of the suction chamber and arranged for direct driving means, a bearing supporting said second mentioned end of the suction roll, said bearing being adapted to permit the rotation of said roll containing the second mentioned suction chamber end, and means extending through the suction roll for lubricating said bearing.

12. The combination with the rotary perforate shell or casing and a suction box therein, the shell or casing having its ends provided with tubular members and the suction box having its ends provided with projections arranged within said tubular members and serving as journals for the rotary shell or casing, one end of the rotary shell or casing being made removable so as to permit the withdrawal of the suction box.

13. The combination with the rotary perforate shell or casing and a suction box therein, a shell or casing having its ends provided with tubular members and the suction box having its ends provided with projections arranged within said tubular members and serving as journals for the rotary shell or casing, one end of the rotary shell or casing being made removable so as to permit the withdrawal of the suction box, and an anti-friction device for facilitating the removal of the suction box.

14. The combination with a rotary perforated shell or casing having its opposite ends provided with tubular members, of a suction box arranged in the shell or casing and having its opposite ends provided with projections arranged within the tubular members of the rotary shell or casing and forming supporting journals therefor, one of said projecting members being extended through and beyond the end of the corresponding tubular member on the rotary shell or casing, and the other projection being confined within its corresponding tubular member on the shell or casing, a pedestal supporting the suction box projection which extends through the corresponding rotary shell or casing tubular member, and a second pedestal having a bearing for the rotary shell tubular member which contains the other suction box projection.

15. The combination with a rotary perforated shell or casing having its opposite ends provided with tubular members, of a suction box arranged in the shell or casing and having its opposite ends provided with projections arranged within the tubular members therefor, one of said projecting members being extended through and beyond the end of the corresponding tubular member on the rotary shell or casing, and the other projection being confined within its corresponding tubular member on the shell or casing, a pedestal supporting the suction box projection which extends through the corresponding rotary shell or casing tubular member, and a second pedestal having a bearing for the rotary shell tubular member which contains the other suction box projection, and bearings for permitting the rotation of the rotary shell or casing relatively to the suction box, said bearings surrounding said suction box projections and being interposed between the same and the corresponding rotary shell or casing tubular members.

16. The combination with the suction roll of an end therefor comprising a tubular portion provided with direct driving means, and a bearing for supporting said tubular portion for rotation, said bearing being arranged for vertical tilting movement.

17. The combination with the suction roll of an end therefor comprising a tubular portion provided with direct driving means, and a bearing for supporting said tubular portion for rotation, said bearing having a circular mounting surface to permit it to have a vertical tilting movement.

18. The combination with the suction roll of an end therefor comprising a tubular portion provided with direct driving means, and a bearing for supporting said tubular portion for rotation, said bearing having a circular mounting surface to permit it to have a vertical tilting movement, and means for limiting said movement.

19. The combination with the suction roll of an end therefor comprising a tubular portion provided with direct driving means, and a bearing for supporting said tubular portion for rotation, said bearing being arranged for vertical tilting movement, and means for tilting said suction roll end and thereby tilting the suction roll.

20. A suction roll having a tubular projecting end and a bearing therefor to permit rotation, said bearing being provided with oil chambers and a cap having an upper recess and said tubular portion being provided with a ring carrying a wiper arranged in said recess.

21. The combination with a suction roll of a suction chamber therein, bearings for the opposite ends of the roll and lubricating means for said bearings comprising a pipe extending through the suction chamber and connected with said bearings.

22. The combination with the suction roll and suction chamber therein, of a mounting for one end of the suction chamber, said mounting being provided with a chamber communicating with the interior of the suction chamber and a suction pipe communicating with said mounting chamber.

23. The combination with suction roll and suction chamber therein having an adjustable top, of means for making air tight joint between top and bottom of said chamber, said means comprising plates secured to the top and fitting against ends of bottom.

24. A suction couch roll having an extended end, supporting means for said couch roll and means associated with said extended end for tilting said couch roll about one of said supporting means.

25. A suction couch roll having an extended end, a fulcrum support for said extended end and means for depressing said extended end about said fulcrum support.

26. A suction couch roll, supports therefor, a member extending beyond one of said supports to form a power arm for tilting said couch roll and mechanism for applying downward pressure to said extended member for effecting tilting movement of said couch roll.

27. A suction couch roll, bearings therefor, one of said bearings being formed to permit tilting movement of said couch roll and means lying outside of said tiltable bearing for tilting said couch roll upon said bearing.

28. A suction couch roll having an extended end, bearings for said couch roll, a bearing for said extended end formed for tilting movement of said couch roll, a yoke for said extended end and screw means associated with said yoke for depressing said extended end.

29. The combination of a suction roll comprising a perforate cylinder and a suction box or chamber therein and a mounting for one end of the suction box or chamber, said mounting being provided with a chamber communicating with the interior of the suction box or chamber and having an aperture to permit communication with the chamber in said mounting.

In testimony whereof, I have hereunto subscribed my name.

EARL E. BERRY.